US012083532B2

(12) United States Patent
Wang et al.

(10) Patent No.: US 12,083,532 B2
(45) Date of Patent: Sep. 10, 2024

(54) SEPARATION DEVICE AND MATERIAL SEPARATION METHOD

(71) Applicant: CONTEMPORARY AMPEREX TECHNOLOGY CO., LIMITED, Ningde (CN)

(72) Inventors: Zilei Wang, Ningde (CN); Qi Zhang, Ningde (CN); Xuesong Zhuo, Ningde (CN); Yanhuang Fan, Ningde (CN); Caixia Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/314,474

(22) Filed: May 9, 2023

(65) Prior Publication Data

US 2024/0173723 A1 May 30, 2024

Related U.S. Application Data

(63) Continuation of application No. PCT/CN2022/134398, filed on Nov. 25, 2022.

(51) Int. Cl.
*B03C 1/06* (2006.01)
*B03C 1/30* (2006.01)

(52) U.S. Cl.
CPC .................. *B03C 1/06* (2013.01); *B03C 1/30* (2013.01); *B03C 2201/18* (2013.01); *B03C 2201/20* (2013.01)

(58) Field of Classification Search
CPC .... B03C 1/06; B03C 1/30; B03C 1/12; B03C 2201/18; B03C 2201/20; B03C 2201/22; B03C 2201/28
See application file for complete search history.

(56) References Cited

U.S. PATENT DOCUMENTS 4,077,872 A 3/1978 Glover et al.
5,667,074 A * 9/1997 Reali ....................... B03C 1/288 209/225

(Continued)

FOREIGN PATENT DOCUMENTS

CN 101648163 A 2/2010
CN 101912817 A 12/2010

(Continued)

OTHER PUBLICATIONS

ISR for International Application PCT/CN2022/134398 mailed Aug. 24, 2023.

(Continued)

*Primary Examiner* — Liam Royce
(74) *Attorney, Agent, or Firm* — LADAS & PARRY LLP

(57) ABSTRACT

A separation device is described. The separation device includes a rack, a turntable rotatably disposed on the rack; and at least one magnetic element disposed on the turntable. The turntable includes a top surface, and the magnetic element is recessed in or flush with the top surface. The separation device includes a separation membrane detachably disposed on the top surface. In some cases, the at least one magnetic element comprises a plurality of magnetic elements, and the plurality of magnetic elements are spaced apart along a circumferential direction of the turntable. The separation device and a material separation method disclosed are capable of reducing impurities in a slurry.

19 Claims, 6 Drawing Sheets

(56) References Cited

U.S. PATENT DOCUMENTS

| | | | | |
|---|---|---|---|---|
| 2010/0158646 | A1 * | 6/2010 | Shandy | B03C 1/286<br>417/423.1 |
| 2018/0178221 | A1 | 6/2018 | Lee et al. | |

FOREIGN PATENT DOCUMENTS

| | | | | | |
|---|---|---|---|---|---|
| CN | 201807452 | U | | 4/2011 | |
| CN | 204816855 | U | | 12/2015 | |
| CN | 107064284 | A | | 8/2017 | |
| CN | 110333168 | A | | 10/2019 | |
| CN | 108031550 | B | | 11/2019 | |
| CN | 111381054 | A | | 7/2020 | |
| CN | 111381056 | A | | 7/2020 | |
| CN | 111638173 | A | | 9/2020 | |
| CN | 112452543 | A | | 3/2021 | |
| CN | 113171876 | A | * | 7/2021 | B03C 1/30 |
| GB | 349550 | A | | 5/1931 | |
| JP | 2002102745 | A | * | 4/2002 | |
| JP | 4951561 | B2 | * | 6/2012 | |

OTHER PUBLICATIONS

Extended European Search Report for Application No. 22908814, dated Mar. 19, 2024, 12 pages.

* cited by examiner

IV-IV

SEPARATION DEVICE AND MATERIAL SEPARATION METHOD

CROSS-REFERENCE TO RELATED APPLICATION

This application is a continuation of PCT/CN2022/134398 filed on Nov. 25, 2022. This application is incorporated herein by reference in its entirety.

TECHNICAL FIELD

The present application relates to the technical field of material separation, in particular to a separation device and a material separation method.

BACKGROUND

In the manufacturing process of products such as batteries processed using a coating technology, surface of a substrate is usually coated with slurry to form electrode plates of batteries. Impurities such as iron or its oxides are easily mixed into the slurry during the preparation of the slurry, affecting quality of the slurry. For example, the powder for preparing the slurry contains impurities, causing that the slurry also contains impurities when the slurry is blended. Therefore, how to effectively remove these magnetic impurities has become a technical problem to be solved.

SUMMARY

In view of the above problems, the present application provides a separation device and a material separation method capable of reducing impurities in a slurry.

The separation device according to an embodiment of the present application includes:

a rack;

a turntable rotatably disposed on the rack; and a magnetic element disposed on the turntable.

In the separation device according to this embodiment of the present application, when a material is poured on the turntable, the magnetic element can effectively adsorb magnetic particles. With the centrifugal force produced by rotation of the turntable, the magnetic particles are kept on the turntable, while the non-magnetic particles of the material centrifugally move away from the turntable. In this way, the magnetic particles are separated from the non-magnetic particles, and thus the magnetic impurities are effectively separated out.

In some embodiments, the magnetic element is embedded in the turntable. In this way, a large area of the magnetic element is connected to the turntable such that the magnetic element is connected stably.

In some embodiments, the turntable includes a top surface, and the magnetic element is recessed in or flush with the top surface. In this way, the top surface structure of the turntable is flatter, facilitating collection and removal of impurities.

In some embodiments, the separation device includes a separation membrane removably disposed on the top surface. In this way, the separation membrane can collect impurities, facilitating removal of impurities.

In some embodiments, the turntable is provided with a gas channel running through the top surface and being configured to produce a negative pressure to adsorb the separation membrane. In this way, the negative pressure produced in the gas channel adsorb the separation membrane, so that the separation membrane can be stably attached to the top surface of the turntable, preventing the separation membrane from moving, and enabling impurities to be stably adsorbed by the magnetic element.

In some embodiments, a negative pressure chamber is formed in the turntable, and the gas channel is in communication with the negative pressure chamber. The separation device includes a vacuum pump, where the vacuum pump is configured to produce a negative pressure in the negative pressure chamber. In this way, the vacuum pump can produce negative pressure in the gas channel through the negative pressure chamber, making it easier to produce a negative pressure in the gas channel.

In some embodiments, the vacuum pump is connected to the gas channel through a pipe, where the pipe and the turntable are partially coaxially disposed. In this way, the pipe and the turntable being partially coaxially disposed prevents undesirable phenomena such as tangling of the pipe with the rotation of the turntable, thereby improving stability of the separation device.

In some embodiments, a material of the turntable includes porous ceramic, where some pores of the porous ceramic form the gas channel. Thus, the porous ceramic has a stable structure and is unlikely to produce new impurities, which can guarantee purity of materials.

In some embodiments, a thickness of the separation membrane ranges from 20 μm to 50 μm. Therefore, the separation membrane is easy to manufacture and has good flexibility.

In some embodiments, a plurality of the magnetic elements are provided, where the plurality of the magnetic elements are spaced apart along a circumferential direction of the turntable. In this way, the plurality of magnetic elements can increase an adsorption range of the magnetic elements, which is beneficial to comprehensively adsorb magnetic particle impurities.

In some embodiments, the plurality of magnetic elements are disposed on a plurality of concentric circles centered on a center of the turntable. In this way, the magnetic element is likely to make contact with the slurry, improving impurity separation capability of the separation device. In addition, the magnetic element is easy to install, which is convenient for manufacturing the separation device.

In some embodiments, a bearing is provided between the rack and the turntable, where the bearing connects the rack to the turntable. In this way, the bearing can reduce friction between the rack and the turntable so that the turntable can rotate more smoothly, and can also improve mechanical efficiency of the separation device.

In some embodiments, the separation device further includes a drive mechanism mounted on the rack, where the drive mechanism is configured to drive the turntable to rotate. In this way, the drive mechanism can provide power for the rotation of the turntable, so as to enable the turntable to rotate automatically.

In some embodiments, the drive mechanism includes a drive member and a transmission assembly, where the transmission assembly is connected to the turntable and the drive member. In this way, the transmission assembly can transmit the power of the drive member to the turntable, so that the turntable can rotate more stably.

In some embodiments, the transmission assembly includes a gear assembly. In this way, the gear assembly can make the turntable rotate stably and transmission efficiency is high.

In some embodiments, the gear assembly includes a first gear and a second gear engaged with the first gear, where the first gear is coaxially disposed with the turntable and fixed to the turntable, and the second gear is mounted on the drive member. In this way, the first gear and the second gear can transmit the power of the drive member to the drive member.

In some embodiments, the first gear has a larger number of teeth than the second gear. In this way, the first gear and the second gear cooperate with each other to enable a rotating speed of the turntable to be within a reasonable range, thereby improving impurity separation capability In some embodiments, the drive member includes a variable speed motor. In this way, the variable speed motor is easy to control.

In some embodiments, the separation device further includes an accommodating element, where the accommodating element surrounds the turntable and is provided with an accommodating groove, and the turntable is at least partially located in the accommodating groove. In this way, the accommodating element can collect the separated materials.

In some embodiments, the turntable is rotatable relative to the accommodating element. In this way, the accommodating element can be fixed, which is convenient for recycling of the separated materials.

In some embodiments, a deflector slot is formed at a bottom of the accommodating groove, where the deflector slot is lower than the turntable, the accommodating element is provided with a through hole, and the through hole achieves communication between the deflector slot and an external environment. In this way, the deflector slot can achieve recycling of the separated materials.

A material separation method includes:

rotating a turntable provided with a magnetic element;

pouring a material onto the turntable so that the magnetic element adsorbs magnetic particles in the material; and collecting the magnetic particles.

In this way, the magnetic element can effectively adsorb the magnetic particles, and with the rotation of the turntable, a centrifugal force is produced, so that the magnetic particles are kept on the turntable, while the non-magnetic particles of the material centrifugally moves away from the turntable. In this way, the magnetic particles are separated from the non-magnetic particles, and thus the magnetic impurities are effectively separated out.

In some embodiments, before the rotating the turntable, the material separation method further includes:

laying a separation membrane on the turntable, and causing the separation membrane to be adsorbed on the turntable.

In some embodiments, the pouring a material onto the turntable includes:

rinsing the separation membrane; and pouring the material on the separation membrane.

In this way, the separation membrane makes the separated magnetic particles easier to recycle.

In some embodiments, the laying a separation membrane on the turntable, and causing the separation membrane to be adsorbed on the turntable includes:

laying the separation membrane on the turntable, and causing the separation membrane to be adsorbed on the turntable by means of vacuum adsorption.

In this way, the separation membrane is adsorbed by vacuum adsorption, which is easier to control and operate.

The above description is merely an overview of the technical solution of the present application. In order to more clearly understand the technical means of the present application so as to implement the technical means in accordance with the contents of the description, and in order to make the above and other objectives, features and advantages of the present application more apparent and easier to understand, the following illustrates specific embodiments of the present application.

BRIEF DESCRIPTION OF THE DRAWINGS

Various other advantages and benefits will become apparent to persons of ordinary skill in the art by reading the detailed description of alternative embodiments below. The drawings are for the purpose of illustrating the alternative embodiments only and are not construed as a limitation to the present application. In addition, throughout the drawings, the same parts are denoted by the same reference signs. In the drawings.

Figure 1:
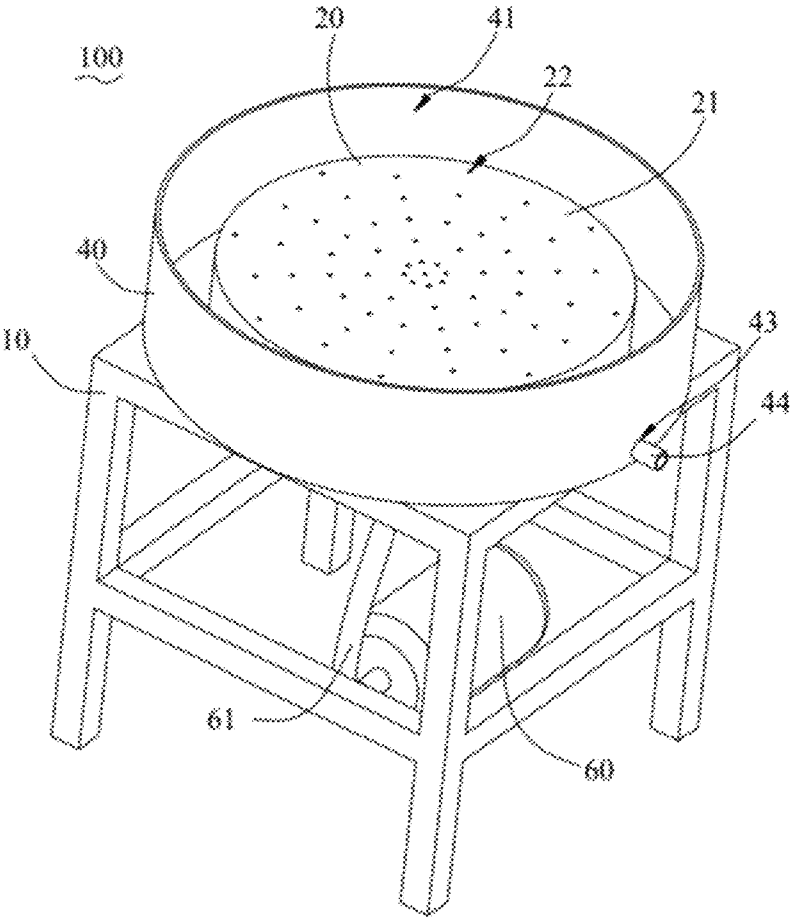
FIG. 1 is a schematic perspective view of a separation device according to some embodiments of the present application.

The reference signs in the specific embodiment are as follows:

separation device 100, rack 10, bearing plummer 11, supporting leg 12, bearing 13, turntable 20, top surface 21, gas channel 22, negative pressure chamber 23, magnetic element 30, accommodating element 40, accommodating groove 41, opening 411, deflector slot 42, through hole 43, insert pipe 44, separation membrane 50, vacuum pump 60, pipe 61, drive mechanism 70, drive member 71, transmission assembly 72, first gear 721, and second gear 722.

DESCRIPTION OF THE EMBODIMENTS

Embodiments of the technical solution of the present application are described below in detail with reference to the accompanying drawings. The following embodiments are merely intended to more clearly illustrate the technical solutions of the present application, and are therefore intended as examples only rather than intended to limit the scope of protection of the present application.

Unless otherwise defined, all technical and scientific terms used herein have the same meanings commonly understood by persons skilled in the art of the present application. The terms used herein are merely intended to describe specific embodiments rather than to limit the present application. The terms "comprising" and "having" and any variations thereof in the description and claims of the present application and the above description of the drawings are intended to cover non-exclusive inclusion.

In the description of the embodiments of the present application, the technical terms "first," "second" and the like are merely used to distinguish between different objects and are not construed as indicating or implying relative importance or implying the number, specific order or primary and secondary relationship of the indicated technical features. In the description of embodiments of the present application, "plurality" means more than two, unless otherwise specifically defined.

"Embodiments" referred to in the present application means that a particular feature, structure, or characteristic described with reference to the embodiments may be included in at least one embodiment of the present application. The presence of the phrase in various places in the description does not necessarily mean the same embodiment, nor is it a separate or alternative embodiment that is mutually exclusive with other embodiments. It is explicitly and implicitly understood by persons skilled in the art that the embodiments described herein may be combined with other embodiments.

In the description of the embodiments of the present application, the term "and/or" herein is merely a description of the association relationship of the associated objects, indicating that three relationships can exist, for example, A and/or B may indicate that A exists alone, both A and B exist, and B exists alone. In addition, the character "/" herein generally means that the associated objects are in an "or" relationship.

As used in the embodiments of the present application, the term "multiple" refers to more than two (including two). Likewise, "multiple groups" refers to more than two (including two) groups, and "multiple pieces" refers to more than two (including two) pieces.

In the description of the embodiments of the present application, it should be understood that orientation or positional relationships indicated by the technical terms such as "center," "longitudinal," "transverse," "length," "width," "thickness," "up," "down," "front," "back," "left," "right," "vertical," "horizontal," "top," "bottom," "inner," "outer," "clockwise," "counterclockwise," "axial," "radial," "circumferential," are orientation or positional relationships shown based on the drawings. These terms are merely for ease and brevity of the description of the embodiments of the present application rather than for indicating or implying that the apparatus or element referred to must have a specific orientation or be constructed and operated in a specific orientation, and therefore cannot be construed as limitations to the embodiments of the present application.

In the description of the embodiments of the present application, unless otherwise specifically stipulated and defined, the technical terms such as "mount," "connect," "link," and "fix" should be understood as their general senses, which, for example, may refer to a fixed connection, a detachable connection, or an integral connection; may refer to a mechanical connection or an electrical connection; may refer to a direct connection or an indirect connection via an intermediate medium; or may also refer to a communication between the insides of two elements. Persons of ordinary skill in the art can understand specific meanings of the above terms in the present application as appropriate to specific situations.

In a production process of some products, powder or slurry is usually used as a raw material, and these raw materials are formed by a predetermined process to obtain a product of a certain shape. The applicants have found that when the powder or slurry is a non-magnetic material, impurities such as magnetic particles may be mixed into these raw materials, resulting in reduction of cleanliness of the raw materials and easily causing disqualification of the manufactured products.

To remove magnetic impurities from raw materials, in some technologies, a magnetic rod can be tightly plastic-sealed, and the plastic-sealed magnetic rod is used to stir a slurry or powder dispersed in a solvent so as to adsorb the magnetic particles. After stirring, the magnetic rod in a plastic sealing bag is taken out, and the particles adsorbed on the surface of the plastic sealing bag are dispersed in a solvent in a beaker to obtain a turbid solution; subsequently, the turbid solution is adsorbed by a magnetic block for a plurality of times and then filtered; and then filtered materials are taken for detection of a quantity of metal particles in the slurry or powder. However, due to the limited surface area of the magnetic rod, it is impossible to completely contact and adsorb the magnetic impurities in the slurry, and there is a risk of missing adsorption. In addition, the magnetic field gravitation decreases sharply with the increase of distance, and the magnetic rod fails to adsorb when moving too quickly and affects work efficiency when moving too slowly.

In order to effectively remove the magnetic particle impurities in the slurry, the inventors have found through research that the magnetic particle impurities can be efficiently removed by adopting magnetic elements to adsorb magnetic particles during centrifugal movement of the slurry. Therefore, the inventors have invented and designed a separation device in which a centrifugal turntable is used to produce a centrifugal force, and a magnetic element on the centrifugal turntable is used to adsorb magnetic particle impurities, thereby effectively adsorbing the magnetic particle impurities in the slurry.

The separation device disclosed in the embodiments of the application can remove magnetic impurities in positive and negative electrode slurry of a battery, but the separation device of the present application is not limited to the technical field of batteries, and can also be used for separating and removing magnetic particles of powder or slurry in other fields.

For the convenience of explanation, the following embodiments are described with a separation device 100 of an embodiment of the present application for removing magnetic particle impurities in a slurry as an example.

Figure 2:
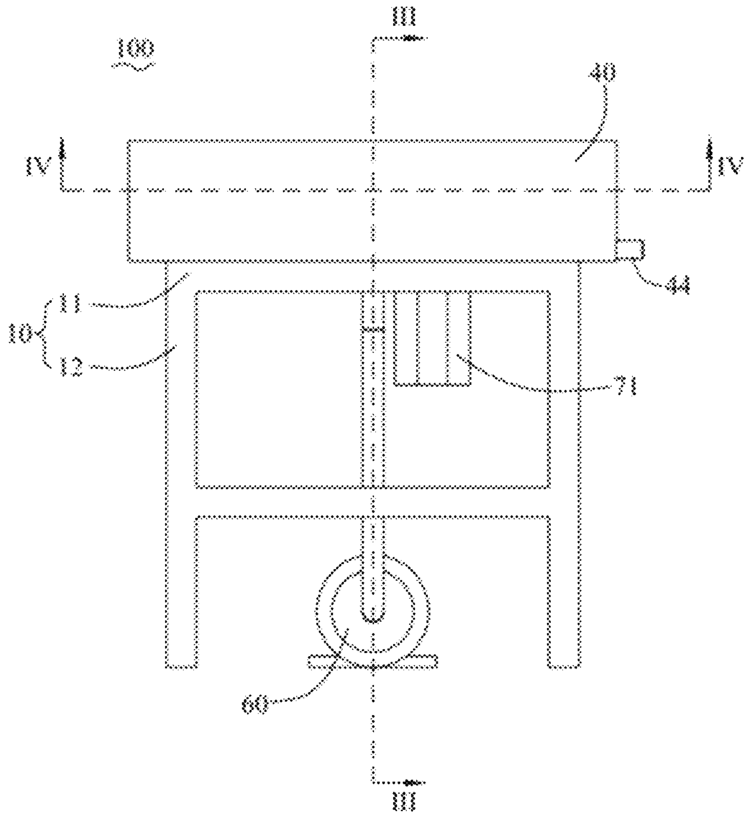
FIG. 2 is a plan view of the separation device according to some embodiments of the present application.
Figure 3:
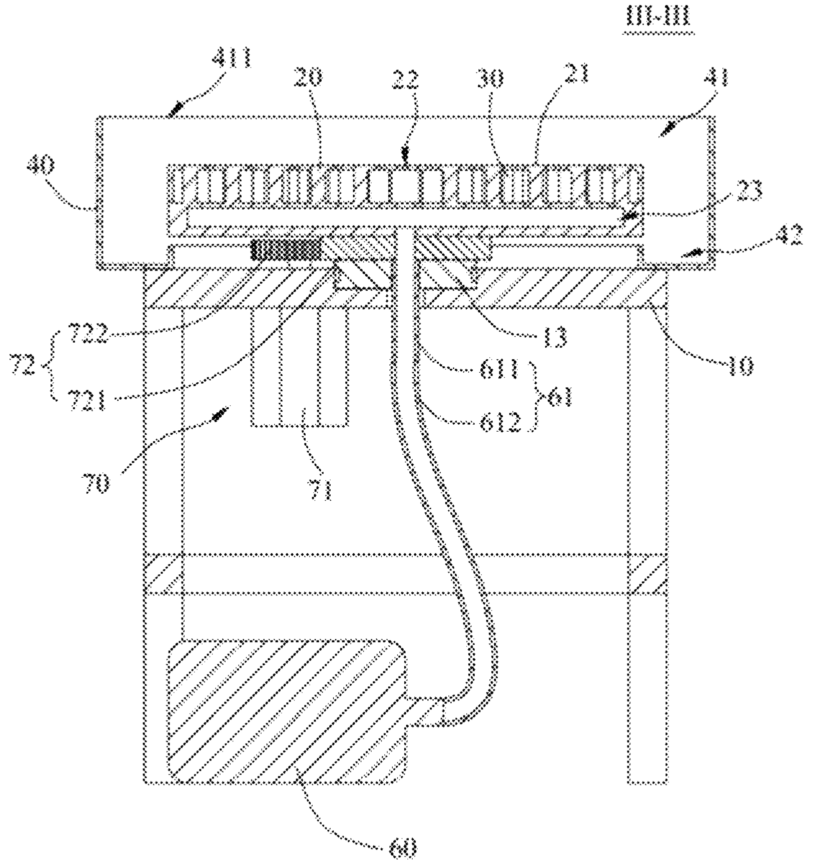
FIG. 3 is a schematic cross-sectional view of the separation device in FIG. 2 in an III-III direction.

Referring to FIGS. 1-3, FIG. 1 is a schematic perspective view of a separation device 100 provided by some embodiments of the present application. FIG. 2 is a plan view of the separation device according to some embodiments of the present application. FIG. 3 is a schematic cross-sectional view of the separation device in FIG. 2 in an III-III direction.

The separation device 100 according to this embodiment of the present application includes a rack 10, a turntable 20, and a magnetic element 30. The turntable 20 is rotatably disposed on the rack 10. The magnetic element 30 is disposed on the turntable 20.

Specifically, the separation device 100 is a device for separating magnetic particle impurities in materials such as slurry or powder. The rack 10 is a main bearing structure of the separation device 100, and the rack 10 is used for bearing other components and parts of the separation device 100. The rack 10 may include a bearing plummer 11 and a supporting leg 12 mounted on the bearing plummer 11. The bearing plummer 11 may be used to bear the components and parts such as the turntable 20. The supporting leg 12 may be supported on the ground. A plurality of supporting legs 12 may be provided, and the plurality of supporting legs 12 are distributed at different positions of the bearing plummer 11 to stably support the bearing plummer 11.

In order to make the rack 10 have a higher load bearing capacity, the rack 10 may be made of a metal material for support, for example, the rack 10 may be made of steel.

The turntable 20 is a component configured to produce a centrifugal force by rotating with respect to the rack 10. The turntable 20 is generally circular, or may be rectangular, elliptical, or in other shapes. The turntable 20 may be directly mounted on the rack 10 or may be mounted on the rack 10 through an intermediate medium component. During operation of the separation device 100, the turntable 20 rotates, the slurry can flow into the center of the turntable 20, and the slurry flows outside the turntable 20 along the circumferential and radial directions of the turntable 20 under the action of the centrifugal force of the turntable 20.

In order to avoid regeneration of particles and to allow a magnetic field formed by the magnetic element 30 to pass through, the turntable 20 may be made of a magnetic field-penetrable material such as stainless steel, aluminum alloy, and ceramics, and such materials are unlikely to damage to generate new particles.

The magnetic element 30 is a component capable of generating a magnetic field therearound. The magnetic element 30 may be a permanent magnet element or an electromagnetic element, and a specific type of the magnetic element 30 is not limited in the present application. The magnetic element 30 may be made of a permanent magnet material such as aluminum nickel cobalt (AlNiCo) or neodymium iron boron (NdFeB). It can be understood that magnetic particles such as iron and its oxides are easily adsorbed on the magnetic element 30 under the action of the magnetic field of the magnetic element 30.

It can be understood that when the turntable 20 is partially located in the accommodating groove 41, the turntable 20 is hermetically connected to the accommodating element 40 so as to prevent material leakage. In order to prevent the accommodating element 40 from easily abrading and producing particles, the accommodating element 40 may be made of a wear-resistant material. For example, the accommodating element 40 is made of stainless steel.

The accommodating groove 41 may be shaped with the turntable 20. For example, when the turntable 20 is cylindrical, the accommodating groove 41 may also be cylindrical, so that the accommodating element 40 and the turntable 20 fit with each other more compactly, facilitating improvement of structural compactness of the separation device 100.

To sum up, in the separation device 100 according to the embodiment of the present application, when the material is poured on the turntable 20, the magnetic element 30 can effectively adsorb the magnetic particles, and a centrifugal force is produced by the rotation of the turntable 20, so that the magnetic particles are kept on the turntable 20, while the non-magnetic particles of the material centrifugally moves away from the turntable 20. In this way, the magnetic particles are separated from the non-magnetic particles, and thus the magnetic impurities are effectively separated out.

Figure 4:
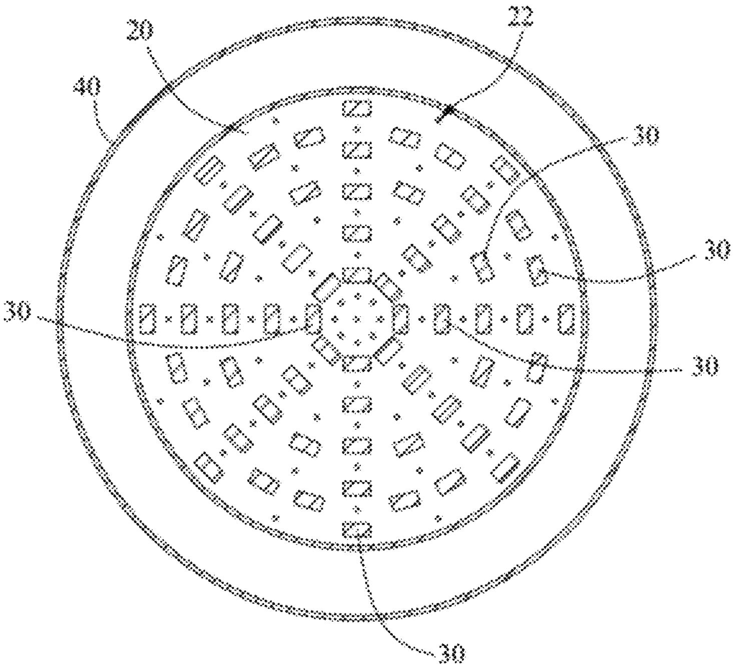
FIG. 4 is a schematic cross-sectional view of the separation device in FIG. 2 in an IV-IV direction.

Referring to FIG. 4, in some embodiments, the magnetic element 30 is embedded in the turntable 20. Specifically, the turntable 20 may be provided with an embedding slot, and the magnetic element 30 may be embedded in the embedding slot by means of interference fit. Certainly, the magnetic element 30 may also be fixedly disposed in the embedding slot by bonding, welding or the like, and the present application does not limit the specific mounting mode of the magnetic element 30. Further, the magnetic element 30 is partially embedded in the turntable 20 or may be completely embedded in the turntable 20. In this way, the magnetic element 30 is connected to the turntable 20 in an embedding manner, so that a larger area of the magnetic element 30 is connected to the turntable 20 and the magnetic element 30 is connected stably.

Referring to FIGS. 3 and 4, in some embodiments, the turntable 20 includes a top surface 21, and the magnetic element 30 is recessed in or flush with the top surface 21. Specifically, the top surface 21 of the turntable 20 faces an opening 411 of the accommodating groove 41. The top surface 21 may be a plane, a curved surface, or a composite surface of various shapes. In order to facilitate manufacturing, the top surface 21 in this embodiment of the present application is a plane.

The magnetic element 30 is recessed in or flush with the top surface 21, that is, the magnetic element 30 is completely embedded in the turntable 20. In this case, the top surface 21 of the turntable 20 has no protruding structure, and the structure of the top surface 21 of the turntable 20 is relatively flat. When the turntable 20 rotates, impurities such as magnetic particles are adsorbed on the top surface 21 or above the top surface 21. Since the top surface 21 is neat and smooth, it is beneficial to collect and remove impurities, facilitate the separation of magnetic impurities in slurry, and improve efficiency of impurity separation.

In some embodiments, the separation device 100 further includes an accommodating element 40, where the accommodating element 40 surrounds the turntable 20 and is provided with an accommodating groove 41, and the turntable 20 is at least partially located in the accommodating groove 41.

Specifically, the accommodating element 40 is a component for accommodating materials. The accommodating groove 41 has an upward opening 411 through which the turntable 20 can be exposed. The materials may fall into the turntable 20 via the opening 411 and be thrown into the accommodating groove 41 of the accommodating element 40 by the centrifugal force of the turntable 20. In the embodiment of the present application, the turntable 20 may be completely accommodated in the accommodating groove 41, or may be partially accommodated in the accommodating groove 41. For example, an upper portion of the turntable 20 is located inside the accommodating groove 41 and a lower portion is located outside the accommodating groove 41. Referring to FIGS. 1-3, in some embodiments, a deflector slot 42 is formed at the bottom of the accommodating groove 41, and the deflector slot 42 is lower than the turntable 20. The accommodating element 40 is provided with a through hole 43, where the through hole 43 achieves communication between the deflector slot 42 and an external environment. Specifically, the deflector slot 42 may be formed at an edge of the accommodating element 40. The deflector slot 42 is generally annular and is located at the lowest part of the interior space of the accommodating element 40. The through hole 43 may be provided in the accommodating element 40, and the through hole 43 achieves communication between the deflector slot 42 and the external environment. The slurry, after undergoing impurity separation, can enter the deflector slot 42 from the turntable 20, and then flows out of the accommodating element 40 via the deflector slot 42 and the through hole 43. Therefore, the deflector slot 42 can achieve recycling of the separated materials.

Further, an insert pipe 44 may be mounted on the accommodating element 40, and the insert pipe 44 communicates with the deflector slot 42. Therefore, the slurry in the deflector slot 42 can flow out of the accommodating element 40 via the insert pipe 44.

In some embodiments, the turntable 20 is rotatable relative to the accommodating element 40. Thus, the accommodating element 40 can be fixed, facilitating the recycling of the separated materials.

As shown in FIG. 3, in some embodiments, a bearing 13 is disposed between the rack 10 and the turntable 20, and the bearing connects the rack 10 to the turntable 20. Specifically, an inner ring of the bearing 13 may be fixedly connected to the turntable 20, and an outer ring of the bearing 13 may be fixedly connected to the bearing plummer 11 of the rack 10, so that the turntable 20 may rotate relative to the rack 10. In this way, the bearing 13 can reduce friction between the rack 10 and the turntable 20 so that the turntable 20 can rotate more smoothly, and can improve mechanical efficiency of the separation device 100. In addition, the bearing 13 may also bear the turntable 20, achieving a load-bearing function.

Figure 5:
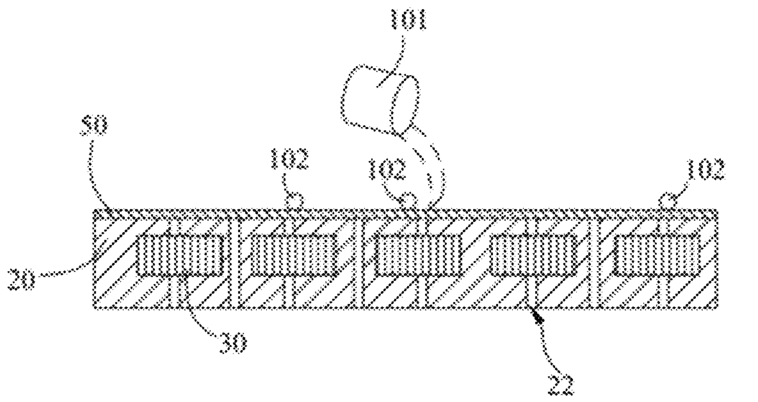
FIG. 5 is a partial structural diagram of the separation device according to some embodiments of the present application.

Referring to FIGS. 3 and 5, in some embodiments, the separation device 100 includes a separation membrane 50 detachably disposed on the top surface 21.

Specifically, the separation membrane 50 is a thin sheet that can be separated from the turntable 20. The separation membrane 50 may be made of a polymer material or the like. For example, the separation membrane 50 is made of polyethylene, polypropylene or the like. When disposed on the top surface 21, the separation membrane 50 can rotate along with the turntable 20. In this case, the slurry can fall onto the separation membrane 50, and magnetic particles are attached to the separation membrane 50 under the adsorption of the magnetic element 30. After the rotation of the turntable 20 is stopped, the magnetic particles can be kept on the separation membrane 50 all the time and the separation membrane 50 is removed from the top surface 21, thereby facilitating the collection and removal of the magnetic particle impurities, preventing the magnetic particles from falling into the separated slurry again, and ensuring the cleanliness of the slurry.

In some embodiments, a thickness of the separation membrane 50 ranges from 20 μm to 50 μm (microns). For example, the thickness of the separation membrane 50 is 20 μm, 25 μm, 30 μm, 50 μm, and the like. If the thickness of the separation membrane 50 is less than 20 μm, it is difficult to manufacture the separation membrane 50, and if the thickness of the separation membrane 50 is greater than 50 μm, the separation membrane 50 is hard and unlikely to deform, which is unbeneficial for the separation membrane 50 to collect magnetic particles. Therefore, when the thickness of the separation membrane 50 is within the above range, the separation membrane 50 is easy to manufacture and has good flexibility.

Referring to FIGS. 3 and 5, in some embodiments, the turntable 20 is provided with a gas channel 22. The gas channel 22 runs through the top surface 21. The gas channel 22 is configured to produce a negative pressure to adsorb the separation membrane 50.

Specifically, the gas channel 22 is a channel through which gas flows. The gas channel 22 may be linear or curved.

The gas channel 22 may run through the top surface 21 from the inside of the turntable 20, or one end of the gas channel 22 is located at the top surface 21. Therefore, gas can flow from the top surface 21 into the turntable 20. When gas flows from the top surface 21 to the inside of the turntable 20, a negative pressure can be formed at a position where the gas channel 22 is located on the top surface 21, and the negative pressure formed by the gas channel 22 adsorbs the separation membrane 50 so that the separation membrane 50 can be stably attached to the top surface 21 of the turntable 20, preventing the separation membrane 50 from moving, so that impurities can be stably adsorbed by the magnetic element 30.

It can be understood that after the negative pressure is released, the adsorption force between the separation membrane 50 and the top surface 21 is released, then the separation membrane 50 can be removed from the top surface 21. Therefore, during separation of the magnetic particles, a negative pressure can be formed in the gas channel 22, and after the magnetic particles are separated, the negative pressure can be released.

A plurality of gas channels 22 may be provided. The plurality of gas channels 22 may be spaced apart, and the plurality of gas channels 22 may provide a plurality of adsorption points for the separation membrane 50, thereby improving adsorption stability of the separation membrane 50.

Certainly, in some embodiments, the separation membrane 50 may be attached to the top surface 21 by bonding or the like.

Referring to FIG. 3, in some embodiments, a negative pressure chamber 23 is formed in the turntable 20, the gas channel 22 is in communication with the negative pressure chamber 23, and the separation device 100 includes a vacuum pump 60 is configured to produce a negative pressure in the negative pressure chamber 23.

Specifically, the negative pressure chamber 23 is a cavity inside the turntable 20, and the vacuum pump 60 is a device for pumping gas. When there are a plurality of gas channels 22, the plurality of gas channels may be connected to the negative pressure chamber 23. A negative pressure can be produced in the negative pressure chamber 23 when the vacuum pump 60 pumps gas, so that a negative pressure is produced in each of the plurality of gas channels 22 so as to adsorb the separation membrane 50. In this way, the vacuum pump 60 can produce a negative pressure in the gas channels through the negative pressure chamber 23, enabling the gas channels 22 to form a negative pressure more easily.

Referring to FIG. 3, in some embodiments, the vacuum pump 60 is configured to produce a negative pressure in the gas channel 22, and the vacuum pump 60 communicates with the gas channel 22 through a pipe 61, and the pipe and the turntable are partially coaxially disposed. Specifically, the pipe 61 may allow gas to flow and the pipe 61 may communicate with the negative pressure chamber 23 so that the negative pressure chamber 23 forms a negative pressure to stably adsorb the separation membrane 50. In addition, the pipe 61 and the turntable 20 are partially coaxially disposed, that is, a central axis of a connecting portion of the pipe 61 and the turntable 20 overlaps with a central axis of the turntable 20, so that an undesirable phenomenon such as tangling of the pipe 61 with the rotation of the turntable 20 is prevented, and the stability of the separation device 100 is improved.

Preferably, the pipe 61 may include a first pipe 611 and a second pipe 612. One end of the first pipe 611 is partially inserted into the turntable 20 and disposed coaxially with the turntable 20, and the second pipe 612 connects the vacuum pump 60 to the first pipe 611. The first pipe 611 may be made of a material having relatively high rigidity such as metal, so that the first pipe 611 does not rotate while the turntable 20 rotates relative to the first pipe 612. The second pipe 612 may be made of a material having relatively low rigidity such as plastic, thereby providing convenience for the second pipe 612 to connect the first pipe 611 to the vacuum pump 60.

Certainly, in other embodiments, the vacuum pump 60 is directly connected to the turntable 20 and communicates with the negative pressure chamber 23.

In some embodiments, a material of the turntable 20 includes porous ceramic, pores of the porous ceramic serving as gas channels 22. Specifically, porous ceramics are products made of main raw materials such as corundum sand, silicon carbide, and cordierite by molding and a special high-temperature sintering process. Porous ceramics have the advantages of open pore size, high opening 411 porosity, high temperature resistance, corrosion resistance, wear resistance, and the like. Therefore, made of porous ceramic, the turntable 20 is stable in structure, new impurities are unlikely to produce, the cleanliness of the materials can be ensured, and the gas channel 22 does not need to be separately formed, thus reducing a processing cost of the turntable 20.

Certainly, in other embodiments, when the turntable 20 is made of stainless steel or the like, a gas channel 22 may be provided in a stainless steel material separately, so that the separation membrane 50 is adsorbed through the gas channel 22.

Referring to FIG. 4, in some embodiments, a plurality of magnetic elements 30 are provided, and the plurality of magnetic elements 30 are spaced apart along the circumferential direction of the turntable 20. As the turntable 20 rotates, the slurry can move from the center of the turntable 20 to the edge along the circumferential and radial direction of the turntable 20 under centrifugation. Therefore, the plurality of magnetic elements 30 being spaced apart along the circumferential direction of the turntable 20 can improve the adsorption probability of impurities such as magnetic particles by the magnetic elements 30, so that the magnetic particle impurities are adsorbed to the magnetic elements 30. In addition, the plurality of magnetic elements 30 can increase the adsorption range of the magnetic elements 30, which is beneficial to comprehensively adsorb magnetic particle impurities.

In some embodiments, a plurality of magnetic elements 30 are arranged on a plurality of concentric circumferences centered on the center of the turntable 20. For example, the plurality of magnetic elements 30 may be arranged on two concentric circumferences, where fewer magnetic elements 30 are arranged on a smaller-diameter circumference and more magnetic elements 30 are arranged on a larger-diameter circumference. In the example of FIG. 4, rectangular frames may all be magnetic elements. In this way, the plurality of magnetic elements 30 are likely to make contact with the slurry, and the impurity separation capability of the separation device 100 is improved. In addition, the magnetic element 30 is easy to install, which facilitates the manufacture of the separation device 100.

In some embodiments, the magnetic elements 30 respectively located on two adjacent circumferences are staggered along the radial direction of the turntable 20. In this way, a magnetic field formed by the plurality of magnetic elements 30 has more uniform intensity distribution, thereby facilitating adsorption of magnetic particle impurities.

In some embodiments, the plurality of magnetic elements 30 may be arranged in dot matrixes or the like, and specific arrangement of the plurality of magnetic elements 30 is not limited in the present application.

Referring to FIG. 3, in some embodiments, the separation device 100 further includes a drive mechanism 70 mounted on the rack 10, where the drive mechanism 70 is configured to drive the turntable 20 to rotate. Specifically, the drive mechanism 70 may be an electromagnetic drive mechanism 70, a hydraulic drive mechanism 70, a gas drive mechanism 70, and the like. These drive mechanisms 70 can drive the turntable 20 to rotate under the action of electric energy or other energy, that is, the drive mechanism 70 can provide power for the rotation of the turntable 20 so as to enable the turntable 20 to rotate automatically.

Referring to FIG. 3, in some embodiments, the drive mechanism 70 includes a drive member 71 and a transmission assembly 72. The transmission assembly 72 connects the turntable 20 to the drive member 71. In this way, the transmission assembly 72 can transmit the power of the drive member 71 to the turntable 20, so that the turntable 20 can rotate more stably.

In some embodiments, the transmission assembly 72 includes a gear assembly. In this way, the gear assembly can make the turntable 20 rotate stably and the transmission efficiency is high.

Certainly, in some embodiments, the drive assembly 72 may also include a pulley transmission assembly 72, a linkage transmission assembly 72 or the like capable of transmitting power.

Referring to FIG. 3, in some embodiments, the gear assembly includes a first gear 721 and a second gear 722 engaged with the first gear 721. The first gear 721 is disposed coaxially with the turntable 20 and fixed to the turntable 20, and the second gear 722 is mounted on the drive member 71. Specifically, the first gear 721 may be fixedly connected to the turntable 20 by welding, bonding or the like, and the second gear 722 may be mounted on the drive member 71 by means of a shaft hole fit. Due to high efficiency of gear drive, the first gear 721 and the second gear 722 can transmit power of the drive member 71 to the drive member 71, and the first gear 721.

In some embodiments, the first gear 721 has a larger number of teeth than the second gear 722. Since the drive member 71 may rotate too fast, making the number of teeth of the first gear 721 larger than the number of teeth of the second gear 722 can reduce the rotating speed transmitted to the turntable 20, and the rotating speed of the turntable 20 can be within a reasonable range, improving the impurity separation capability of the separation device 100.

In some embodiments, the drive member 71 include a variable speed motor. In this way, the variable speed motor is easier to control, so that the rotating speed of the drive member 71 is more reasonable, thereby facilitating improvement of capability of the separation device 100 for separating impurities such as magnetic particles.

Figure 6:
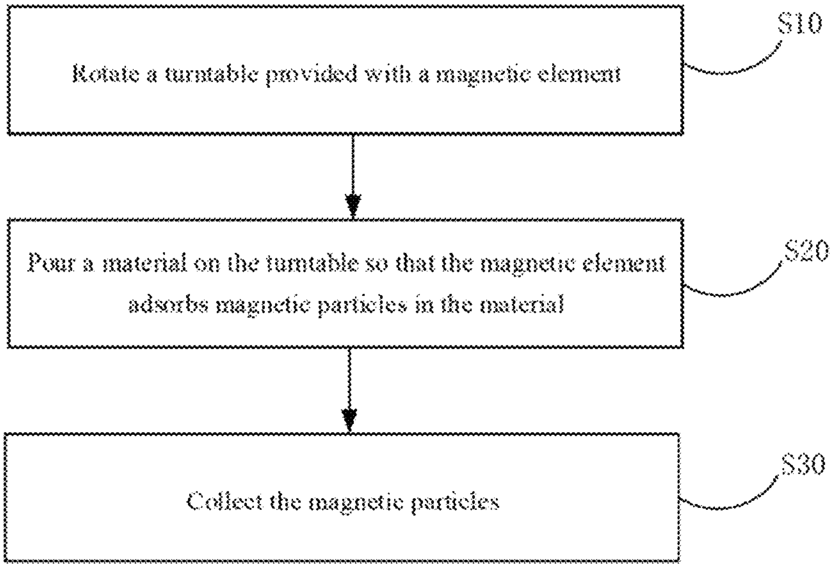
FIG. 6 is a schematic flowchart of a material separation method according to some embodiments of the present application.

Referring to FIG. 5 and FIG. 6, the present application further provides a material separation method which can be implemented by the above separation device 100. The material separation method includes:

S10. Rotate a turntable 20 provided with a magnetic element 30.

S20. Pour a material onto the turntable 20 so that the magnetic element 30 adsorbs magnetic particles in the material.

S30. Collect the magnetic particles.

Specifically, the turntable 20 can rotate by virtue of the drive mechanism 70. The material may be in direct contact with the turntable 20 or may be isolated from the turntable 20. The magnetic particles can be collected in beakers and other containers.

Figure 7:
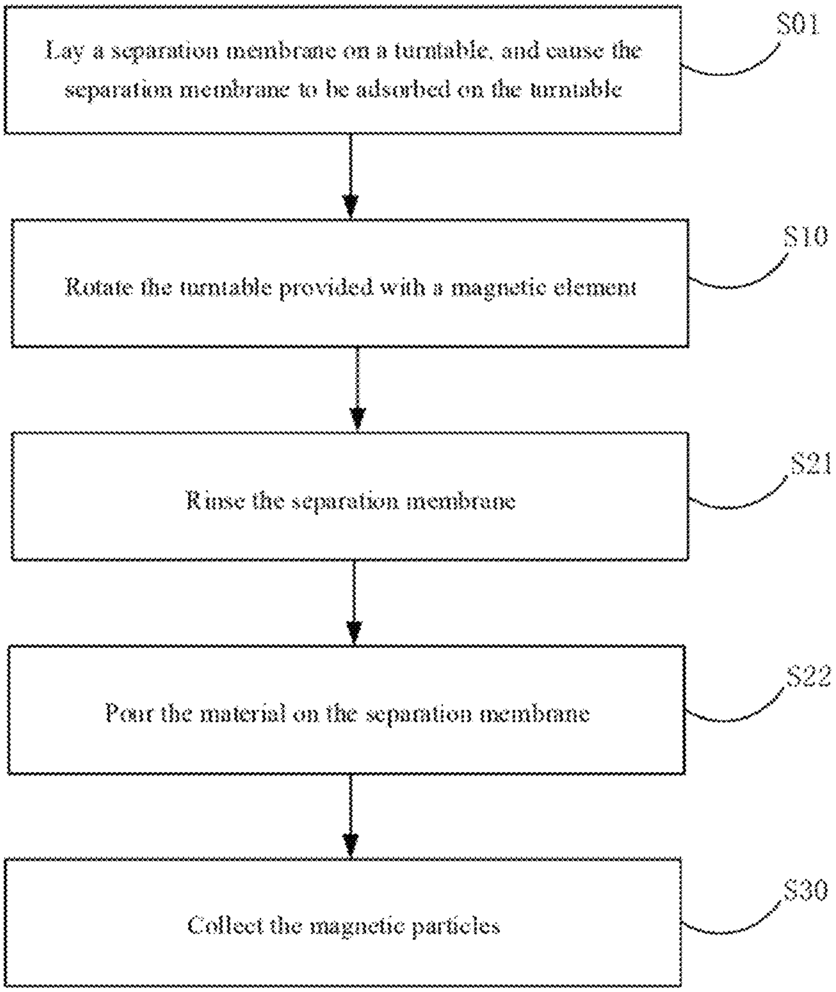
FIG. 7 is another schematic flowchart of the material separation method according to some embodiments of the present application.

Referring to FIG. 7, in some embodiments, prior to step S10, the material separation method further includes:

S01. Lay a separation membrane 50 on the turntable 20, and cause the separation membrane 50 to be adsorbed on the turntable 20. In this way, the separation membrane 50 makes the separated magnetic particles easier to recycle.

Referring to FIG. 7, in some embodiments, the step S20 includes:

S21. Rinse the separation membrane 20.

S22. Pour the material on the separation membrane 20.

Specifically, organic solvents such as NMP (N-methylpyrrolidone) can be used to rinse the separation membrane 20. After the separation membrane 20 is rinsed, surface of the separation membrane 50 is smoother and the non-magnetic particles are easier to separate from the separation membrane 50. The material is poured on the separation membrane 20, so that the separation membrane 20 can collect the separated magnetic particles centrally, and the collection efficiency is high.

In some embodiments, step S01 includes:

Lay the separation membrane 50 on the turntable 20, and cause the separation membrane 50 to be adsorbed on the turntable 20 by means of vacuum adsorption.

Specifically, the separation membrane 50 can form a negative pressure in the turntable 20 using the above-mentioned vacuum pump 60 in conjunction with the pipe 61, thereby adsorbing the separation membrane 50 so that the separation membrane 50 is more easily attached to the turntable 20.

To sum up, in one example, an impurity separation process of slurry is roughly as follows:

Lay the separation membrane 50 on the turntable 20, and then turn on the vacuum pump 60 so that the separation membrane 50 is adsorbed on the turntable 20;

after that, turn on the variable speed motor to make it rotate at a constant rotating speed;

rinse the separation membrane 50 with a small amount of organic solvent, for example, an NMP (N-methylpyrrolidone) solvent, so that the surface of the separation membrane 50 is smoother and the non-magnetic particles are more easily separated from the separation membrane 50;

then slowly pour the uniformly diluted slurry or powder mixture in the beaker 101 into the center of the turntable 20, and after the pouring, clean the beaker three times, and then slowly pour the cleaning solution obtained after cleaning into the center of the turntable;

after all the cleaning solution is poured, turn off the variable speed motor and then the vacuum pump 60; and remove, when the rotation of the turntable 20 stops, the separation membrane 50, and collect the particles 102 attached to the surface of the separation membrane 50 into a container such as a beaker, thereby completing the collection of the magnetic impurities.

It should be noted that the explanation of the separation device 100 according to the embodiments of the present application is applicable to the material separation method according to the embodiments of the present application. For the parts of the material separation method according to the embodiments of the present application that are not described, please refer to similar or identical parts of the separation device 100 according to the above embodiment, which will not be repeated here.

Finally, it should be noted that the above embodiments are merely intended to illustrate the technical solutions of the present application rather than to limit it. Although the present application has been described in detail with reference to the foregoing embodiments, it should be understood by persons of ordinary skill in the art that the technical solutions described in the foregoing embodiments can still be modified or some or all of the technical features thereof can be equivalently replaced. However, these modifications or substitutions do not depart the essence of the corresponding technical solution from the scope of the technical solution of each embodiment of the present application, and should all fall within the scope of the claims and descriptions of the present application. In particular, all the technical features mentioned in the embodiments can be combined in any manner so long as there is no structural conflict. The present application is not limited to the specific embodiments disclosed herein but includes all the technical solutions falling within the scope of the claims.

The invention claimed is:

1. A separation device, comprising:

a rack;

a turntable rotatably disposed on the rack; and at least one magnetic element disposed on the turntable;

wherein the turntable comprises a top surface, wherein the separation device comprises a separation membrane detachably disposed on the top surface.

2. The separation device according to claim 1, wherein the at least one magnetic element comprises a plurality of magnetic elements, and the plurality of magnetic elements are spaced apart along a circumferential direction of the turntable.

3. The separation device according to claim 2, wherein the plurality of magnetic elements are disposed on a plurality of concentric circles centered on a center of the turntable.

4. The separation device according to claim 1, wherein the magnetic element is embedded in the turntable.

5. The separation device according to claim 4, the magnetic element is recessed in or flush with the top surface.

6. The separation device according to claim 1, wherein the turntable is provided with a gas channel, wherein the gas channel runs through the top surface and is configured to produce a negative pressure to adsorb the separation membrane.

7. The separation device according to claim 6, wherein a negative pressure chamber is formed in the turntable, the gas channel is in communication with the negative pressure chamber, and the separation device comprises a vacuum pump configured to produce a negative pressure in the negative pressure chamber.

8. The separation device according to claim 6, wherein the separation device comprises a vacuum pump configured to produce a negative pressure in the gas channel, the vacuum pump is connected to the gas channel through a pipe, and the pipe and the turntable are partially coaxially disposed.

9. The separation device according to claim 6, wherein a material of the turntable comprises porous ceramic, pores of the porous ceramic serving as gas channels.

10. The separation device according to claim 1, wherein a bearing is disposed between the rack and the turntable, the bearing connecting the rack with the turntable.

11. The separation device according to claim 1, wherein the separation device further comprises a drive mechanism mounted on the rack, and the drive mechanism is configured to drive the turntable to rotate.

12. The separation device according to claim 11, wherein the drive mechanism comprises a drive member and a transmission assembly, the transmission assembly connecting the turntable with the drive member.

13. The separation device according to claim 12, wherein the transmission assembly comprises a gear assembly.

14. The separation device according to claim 13, wherein the gear assembly comprises a first gear and a second gear engaged with the first gear, wherein the first gear is coaxially disposed with the turntable and fixed to the turntable, and the second gear is mounted on the drive member.

15. The separation device according to claim 14, wherein the first gear has a larger number of teeth than the second gear.

16. The separation device according to claim 15, wherein the drive member comprises a variable speed motor.

17. The separation device according to claim 1, wherein the separation device further comprises an accommodating element, wherein the accommodating element surrounds the turntable and is provided with an accommodating groove, and the turntable is at least partially located in the accommodating groove.

18. The separation device according to claim 17, wherein the turntable is rotatable relative to the accommodating element.

19. The separation device according to claim 18, wherein a deflector slot is formed at a bottom of the accommodating groove, wherein the deflector slot is lower than the turntable, the accommodating element is provided with a through hole, and the through hole achieves communication between the deflector slot and an external environment.

* * * * *